Jan. 5, 1954  A. PARNET  2,664,641
INDEXING DEVICE
Filed July 17, 1946  4 Sheets-Sheet 3
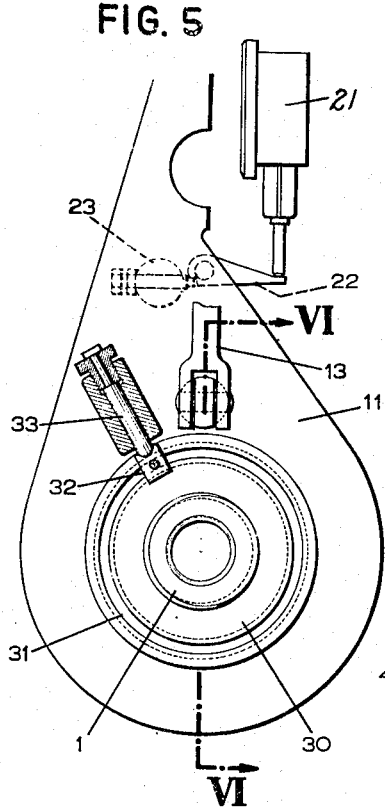
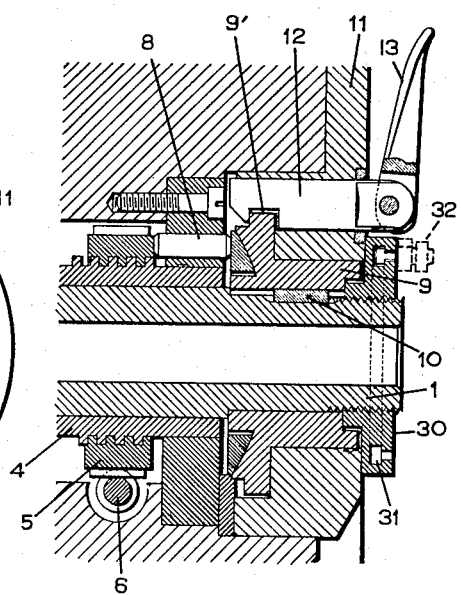
Inventor:
A. Parnet
By E. F. Wenderoth
Atty Jan. 5, 1954     A. PARNET     2,664,641
INDEXING DEVICE
Filed July 17, 1946     4 Sheets-Sheet 4
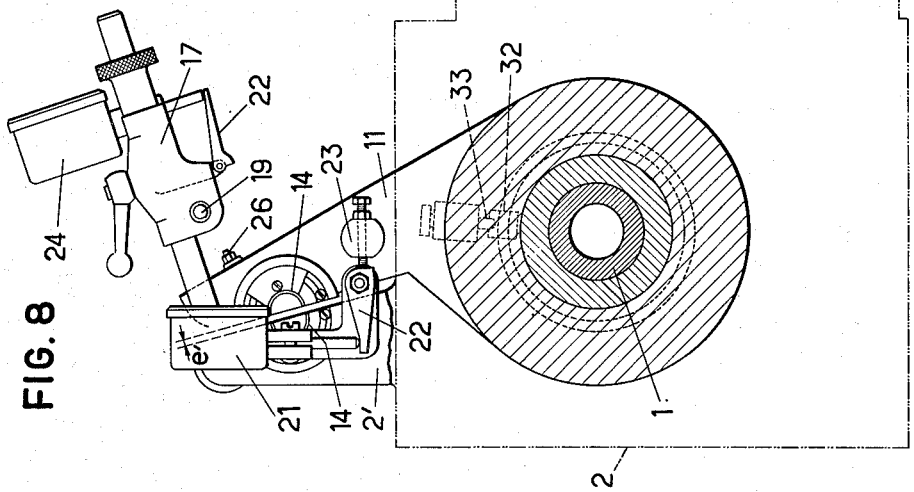
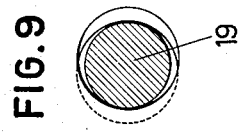
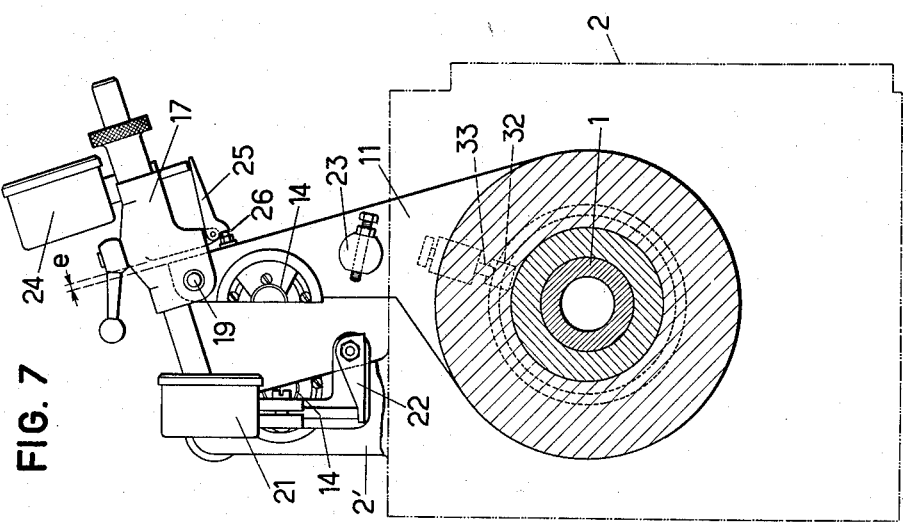
INVENTOR:
ARSÈNE PARNET
By Wenderoth, Lind & Ponack
ATTORNEYS Patented Jan. 5, 1954

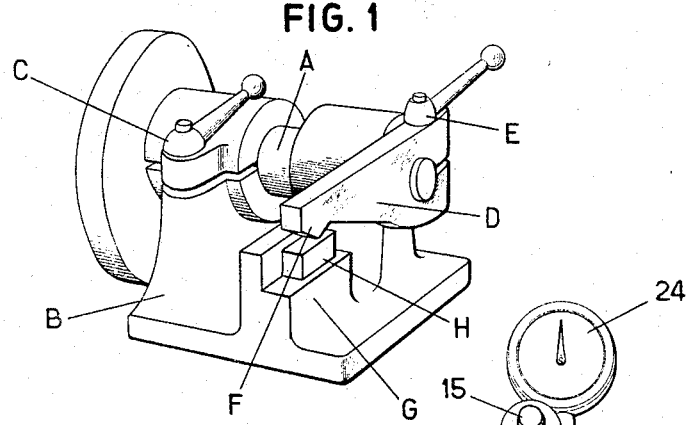
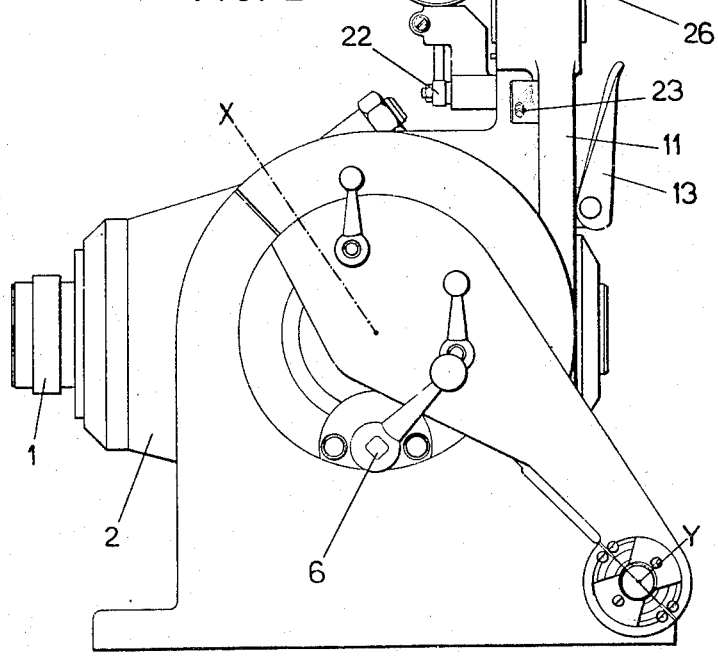

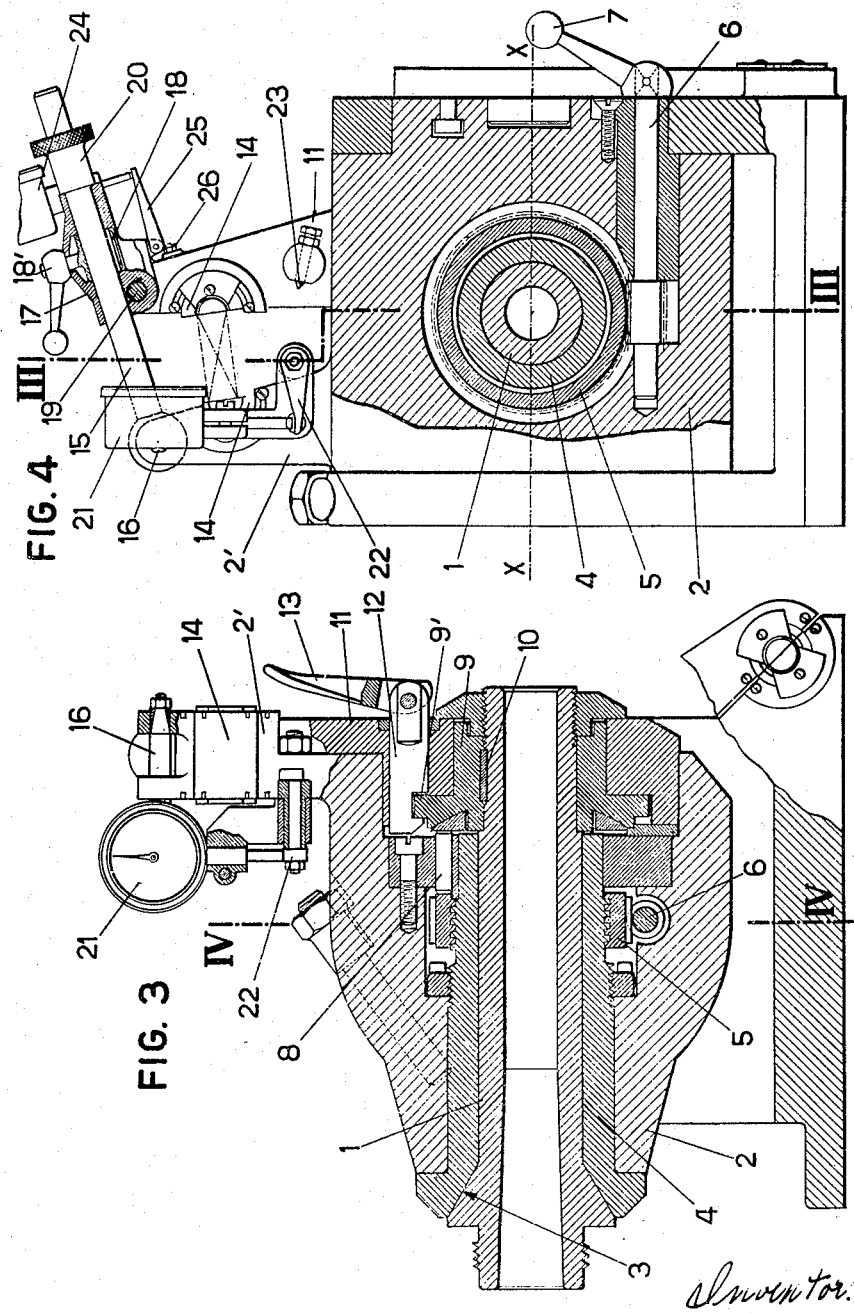

2,664,641

UNITED STATES PATENT OFFICE 2,664,641

INDEXING DEVICE

Arsène Parnet, Paris, France

Application July 17, 1946, Serial No. 684,230
In Germany April 4, 1941

Section 1, Public Law 690, August 8, 1946
Patent expires April 4, 1961

12 Claims. (Cl. 33—174)

This invention relates to an indexing device whereby angular movements may be imparted to a rotative element with high accuracy.

An object of the invention is to provide a device whereby successive angular movements may be given to a member easily and with extreme accuracy.

A further object is to provide means whereby the angular movement to be given a certain member is first calibrated by a movable member and such movement is subsequently transmitted to the first mentioned member.

A still further object of the invention is to provide means whereby successive movements of the same magnitude may be easily and quickly made without the use of guages.

A still further object of the invention is to provide means whereby errors may be compensated for.

With the above and other objects in view which will become apparent from the detailed description below one embodiment of the invention is shown in the attached drawings in which:

Fig. 1 is a perspective view of a device illustrating the principle involved.

Fig. 2 is a side view of the invention as applied to a machine tool.

Fig. 3 is a cross-sectional view of the device shown in Fig. 2 taken upon section line III—III of Fig. 4.

Fig. 4 is a partial cross-sectional view taken upon section line IV—IV of Fig. 3.

Fig. 5 is a front elevational view with parts in section illustrating the means provided for correcting possible errors in recurrent angular movements.

Fig. 6 is a cross sectional view taken upon section line VI—VI of Fig. 5.

Fig. 7 is an elevational view illustrating the operation of the device for compensating for errors with the parts in one position.

Fig. 8 is a similar view to Fig. 7 illustrating the parts in another position, and Fig. 9 is a partial cross sectional view illustrating one manner in which errors might arise.

In the various views similar reference characters indicate like parts.

Referring to Fig. 1 the shaft A rotates in the stationary headstock B in a split bearing. The shaft A may be locked to the headstock B by operating the handle operated screw C. An arm D is rotatably mounted on the shaft A by means of a split sleeve and the arm D may be connected fixedly to the shaft A by operating the handle operated screw E. The free end of the arm D constitutes a movable contact F and a stationary contact G is provided upon the headstock B cooperating with the movable contact F.

The above construction illustrates the principle which is utilized in applying the invention to machine tools of various kinds such as gear cutters and the like. The operation for rotating the shaft A through a predetermined angle is as follows. The shaft A is first locked to the headstock B by operating the screw C. The arm D is free to turn upon the shaft A. Then a calibrated guage H is placed upon the fixed contact G and the contact F of the arm D is brought into contact with such guage, as shown in Fig. 1. Then the arm D is locked to the shaft A by operating the screw E. The screw C is then loosened freeing the shaft from the headstock B, the guage H removed and the contact F brought into contact with the fixed contact G. This brings about an angular rotation of the shaft A exactly equal to the guage H. The shaft A can then again be fixed in position by the screw C and the operation repeated as often as desired.

The guage H may correspond for instance to the tangent of the angle through which the shaft A is to be turned. It is obvious that various angular movements may be imparted to the shaft A by utilizing guages of different sizes.

The principle disclosed above may have numerous different applications.

The application of this principle to a machine tool such as for instance a gear cutting machine will now be described and is shown in Figs. 2 to 9 inclusive.

Referring to Fig. 3 the rotative shaft 1 may be fixed to the frame 2 by locking its conically tapered end portion 3 in a correspondingly conically tapered bore provided in a stationary sleeve 4 fixed to the frame 2.

This locking operation is brought about by the following means. A nut 5 is screwed on a threaded portion of the sleeve 4 and the nut 5 is provided with gear teeth upon its outer periphery engaging a worm 6 operated by means of the handle 7. The nut 5 when moved by the worm 6 engages a plurality of push rods 8 which in turn engage a sleeve 9 keyed at 10 to the shaft 1. A movement of the nut 5 therefore towards the right in Fig. 3 will bring about a corresponding movement of the shaft 1 thereby locking the conical portion 3 to the similarly shaped bore in the sleeve 4.

The movable arm 11 which corresponds to the arm D of the construction shown in Fig. 1 is concentrically journalled on the sleeve 9 and may freely rotate thereon as long as the sliding member 12 operated by a cam lever 13 does not frictionally engage a shoulder 9' provided on the sleeve 9. However when the lever 13 is moved downwardly from the position shown in Fig. 3 then the arm 11 is coupled with the shaft 1 through the sleeve 9.

The contacts provided in this construction for measuring off the angular movements to be given to the shaft 1 comprises the semicylindrical members 14 rotatably mounted in semicylindrical bearings. These bearings are provided on one hand in the moveable arm 11 and on the other hand in a fixed arm 2' fixed to the frame 2. Guages or any other calibrated measuring instruments may be introduced between the semicylindrical members 14 as shown in dot and dash lines in Fig. 4 which correspond to the angle through which the shaft 1 is to be moved.

In many machines successive movements of the same amplitude are given to the shaft 1. In order that these successive angular movements of exactly equal scope may be provided with facility the following instrumentalities have been provided. A threaded rod 15 is fulcrumed at 16 to the stationary arm 2'. A slider 17 is provided on the rod 15 and may be locked at any position on the rod 15 by means of a yoke 18 cooperating with a locking screw nut 18'. The slider 17 may be connected with little clearance with the moveable arm 11 by a pin 19 which engages in a bore provided in the arm 11 and a corresponding bore provided in the yoke of the slide.

When the slider 17 is disengaged by loosening the screw nut 18' the contacts 14 may be accurately brought nearer by operating the screw nut 20 threaded on the rod 15 until the contacts engage the guage located therebetween which corresponds to the angle through which the shaft 1 is to be turned. This accurately locates the arm 11 and it is then sufficient to lock the slider 17 on the rod 15 by means of the screw nut 18' thereby tightening the yoke 18.

To rotate the shaft 1 through the desired angle it is only necessary to remove the pin 19 and then move the arm 11 towards the fixed arm 2' until the contacts 14 engage. The arm 11 has previously been locked to the sleeve 9 by operating the lever 13. The shaft 1 having been turned the requisite amount with relation to the frame 2 the shaft 1 is again locked to the frame by operating the handle 7.

In order to turn the shaft 1 through the same angle again the arm 11 is disengaged from the sleeve 9 and the moveable arm 11 is brought back until the pin 19 may be again introduced into the bores provided upon the arm 11 and the slider 17. This operation may be repeated as often as desired.

In order to control exactly the end position of the arm 11 there has been provided a micrometer registering device 21 which in cooperation with an amplifying lever 22 and an adjustable contact 23 visually indicates when the arm 11 is in zero position when the contacts 14 engage each other. A second micrometer registering device 24 cooperating with an amplifying lever 25 and a contact 26 visually indicates when the arm 11 has been moved to the position determined by the guage used in the first instance.

Notwithstanding the extreme accuracy of the present device it is practically impossible to avoid some errors from arising. It is obvious that when the same angular movement is repeated a slight error at the beginning will be added at each operation. Normally in industry the angular movements are carried out so as to bring about an exact division of 360° and therefore it is necessary to return to the starting point after a certain number of angular movements.

A construction is illustrated in Figs. 5 and 6 whereby it is possible to control the error occasionally committed at the beginning and to rectify such error when the device returns to its starting position. As shown in Figs. 5 and 6 a circular groove 31 is provided in a disc 30 fixed to the shaft 1. One or more sliders 32 are adapted to slide in the circular groove 31. An index 33 is mounted on the movable arm 11 which may slide readily and is designed to cooperate with the slider or sliders 32.

This construction operates as follows. When a number of angular movements have been carried out which are sufficient to rotate the shaft 1 through a complete revolution or a whole number of revolutions the index 33 is engaged with the slide 32. The arm 11 is to be fixed to the slide 17, by means of a pin 19 which is to be engaged with little clearance through suitable openings provided in both arm 11 and in slide 17. Since this clearance is not compatible with the accuracy necessary in the operation of the device, two micrometers, 21 and 24 are provided, the first to indicate the zero at the closed position of the divider formed of the two half cylinders 14 and the second micrometer to indicate the zero with the divider in an open position. The value of the opening corresponds to the angle desired, this angle being previously adjusted in order that the pin 19 can engage into the holes provided in arm 11 and slide 17. Thus by means of adjustable screw 23 and lever 22, the micrometer is calibrated at zero for perfect contact between the two half cylinders 14 and by the adjustment of screw 26 and lever 25, the micrometer is at zero when arm 11 has been turned about the predetermined and previously adjusted angle corresponding to the point of induction of pin 19. Because of the double micrometer check above indicated the accuracy of the action of the two half cylinders 14 and of the adjustment of the slide 17 and pin 19 is greatly improved. The arm 11 having been freed by operating the handle 13 permits a direct reading on the micrometer registering device 21 of the total angular error which is a product of the original error by the number of angular movements made. The total angular error being known the error originally made may be easily rectified. In various cases it may happen that a single complete revolution may not disclose the error in question. In such case the possible error may be detected after a series of complete revolutions.

In order to obtain a better distribution of the errors which may be committed and to prevent the totality of the elementary errors from being grouped between the first and the last measure, the same disc 30 is adapted to receive several sliders 32 permitting the totality of the measures to be carried out in several fractional operations whose number is a submultiple of the total number of said measures, each fractional operation being afterwards subdivided in its turn.

In order to reach, for instance, the number of 120 divisions in a complete revolution, it is possible to carry out, at first, only 12 divisions and to subdivide each of them into 10 divisions. The divisions into 10 parts may be controlled in the same manner as the divisions into 12 parts, by introducing the index 33 in the groove of a second slider (not illustrated on the drawing) previously locked when the divisions into 12 parts are taken into consideration.

There is given below a detailed operation of the indexing device with its two micrometer registering devices permitting registering successively a certain number of equal divisions.

It is assumed that it is desired to divide successively any element whatever into a certain number of strictly equal portions.

For this purpose one may proceed by marking the angles with the aid of a guage which is the same for all the divisions.

In order to simplify this the applicant has provided the device formed by the elements 15, 17 and 19.

According to the usual method when the shaft 1 is locked with respect to the frame and the movable arm 11 is free it is sufficient to place between the two semicylinders 14 a guage represented by the dot and dash lines upon Fig. 4, then to lock the arm 11 upon the shaft 1, liberate the shaft 1 from the frame, release the guage, and then bring the two semicylinders 14 into contact with one another to rotate the shaft 1 the amount desired.

When the rod 15 and its slide 17 are used, at the time the guage is in position as shown in Fig. 4, by operating the screw nut 20, the slide 17 is moved into such a position that pin 19 can be introduced at the same time into the slide and the arm 11, and then by means of the screw 18' the slide is locked upon the rod 15.

The rod 15 then plays a role similar to a guage and it is easier to secure identical angles of rotation by registering the holes in the arm 11 and the slides 17 through which the pin 19 passes then by placing the guage between the semicylinders 14 each time.

Thereafter for each division the operation is as follows. The shaft 1 is locked to the frame and the arm 11 freed. Then the arm 11 is turned until the opening therein coincides with the opening in the slide 17. The pin 19 is introduced. The shaft 1 of the apparatus is released after the arm 11 has been locked thereto. The key 19 is withdrawn and the two semi-cylinders 14 are brought back into contact. The angle of rotation sought is thereby secured.

Meanwhile as shown in Fig. 9 it is necessary in order that the pin 19 may be introduced into the openings provided therefor that a certain play exists. This play is not compatible with the greatest precision of the apparatus.

It is in order to avoid this inconvenience that the two micrometer registering devices 21 and 24 have been provided to mark exactly, first, the contact position of the divider (two semicylinders 14 in contact) and second, the open position at the desired angle controlled by the advance to the point of introduction of the key 19.

By means of the regulable screw 23 and the lever 22 the micrometer registering device 21 is at zero when there is perfect contact between the two semicylinders 14. By means of the screw 26 and to the lever 25, the micrometer registering device 24 is at zero when the arm 11 has been turned exactly to the desired angle corresponding to the point of introduction of the key 19.

Consequently the two micrometer registering devices visually indicate the action on one hand of the two semicylinders 14 and on the other hand of the slides 17 and the key 19 thereby securing greater precision.

An example of the operation of these two micrometer registering devices is given upon Figs. 7 and 8 of the attached sketch. It is assumed that a given circumference is to be divided into $n$— portions, which is the case for example for cutting gears. Before any operation the two micrometer registering devices are regulated so that they are respectively at zero for the angle 0 (micrometer 21) and for the division angle (micrometer 24).

It is also assumed that due to a systematic error at each division the $n^{th}$ rotation will not return the shaft 1 exactly to its starting position, as this would be the case if the division was exact.

Upon Fig. 7 it is assumed that the $n$—1 rotation of the shaft 1 is to be made. Then the shaft 1 is locked to the frame, the arm 11 is freed so that it may turn until the index 33 enters the slide 32. If the division has been exact, the arm 11 may then turn for one division and after placing the key 19 in position the micrometer 24 should be at zero.

It is not usually so and the micrometer 21 registers a certain deviation $e$. Then if the last rotation is carried out in the same manner as the preceding (that is after having turned the arm 11 until the micrometer 24 returns to zero, therefore to the correspondence position of the index 33 and the slide 32), the shaft 1 will normally go beyond its starting position by $e$. Consequently one may say that each division is too large by $e/n$, and one may make the corresponding correction if one wishes to return exactly to the starting position.

The relationship of the micrometers 21 and 24 and the index 33 is the following:

As it is disclosed above, the arm 11 is supposed to be fixed to the slide 17, by means of a pin 19 which is to be engaged with little clearance through suitable openings provided in both the arm 11 and slide 17. As this clearance is not compatible with the great accuracy claimed for the device, two micrometer indicating devices 21 and 24 have been provided, the first to indicate exactly the closed position of the divider formed of two half-cylinders 14, position whereon the latter are brought into contact, the second micrometer to show the said divider into an open position, the rate of opening corresponding to the desired angle, previously adjusted and corresponding to the position in which the pin 19 can be engaged into the holes provided in both the arm 11 and slide 17.

Thus by means of the adjustable screw 32 and lever 22 the micrometer indicating device 21 is at zero when there is perfect contact between the two half-cylinders 14 and means of screw 26 and lever 25 the micrometer indicating device is at zero when the arm 11 has been turned exactly about the desired and previously adjusted angle corresponding to the point of introduction of the pin 19.

Consequently, the two micrometer devices double on the one hand the action of the two half-cylinders 14 and on the other hand of the slide 17 and the pin 19 thereby securing a greater accuracy.

If it is assumed that a given circumference is to be divided into $n$— equal portions, previous to any operation the two micrometers are adjusted so as to be at zero for the angle 0 (micrometer 21) and for the desired angle (micrometer 24).

It is further assumed that due to a systematic error at each division, the $n^{th}$ rotation does not return the shaft 1 exactly to its starting position.

In Fig. 7 it is for instance assumed that the $(n-1)^{th}$ rotation of the shaft 1 has been carried out. Then the shaft 1 is locked to the frame 2, the arm 11 is freed and rotated until the index 33 enters the slide 32. If the division had been accurate, the arm 11 should have rotated for one division, and after having placed the pin 19 into position, the micrometer 24 should be at zero.

This is not the case, and according to Fig. 7 the micrometer 24 indicates a certain deviation $e$. Consequently, if the last rotation is carried out the same way as the preceding ones (that is to say after having rotated the arm 11 until the micrometer 24 returns to zero, consequently beyond the corresponding position of index 33 and slide 32), the shaft 1 would normally go beyond its starting position by an amount equal to $e$. Consequently each division is too large by $e/n$.

Upon Fig. 8 it is assumed that after having carried out $n$ divisions (the last not with the aid of the micrometer but after having made the index 33 and slide 32 coincide), the micrometer 21 is not located at zero but registers a deviation $e'$. This means that each division is too small by $e'/n$ and that it is necessary to increase it by this quantity if it is desired to fall back finally to the starting position.

This is only one example of a use of the two micrometer registering devices showing their utility.

The whole device just described may be also rotatably mounted on the frame of the apparatus in such a manner that it may be turned about the axis X—X by means of a device analogous to the preceding one and located at Y, which permits the main part of the dividing device to be disposed with any suitable inclination with regard to the frame. In that case, it is not even necessary to provide a repeating device, although such a device (similar to that precedingly described) might be advantageously considered for various applications.

The general process and appliance which the invention has for its object and which is diagrammatically shown in Fig. 1, may receive other application than that shown in Fig. 2 to 4. It may, for instance, be incorporated in a horizontal disc (said disc supporting the pieces to be worked) adapted to be connected, at will, either with its holder, or with a movable arm and to cooperate with a repeating device of the kind referred to above.

Likewise, it would be possible to dispose said disc with a given inclination with regard to the frame, the angle corresponding to that inclination being susceptible to be measured in the same manner as that described above.

It is thought that the invention and its advantages will be understood from the foregoing description and it is apparent that various changes may be made in the form, construction and arrangement of the parts without departing from the spirit and scope of the invention or sacrificing its material advantages, the form hereinbefore described and illustrated in the drawings being merely a preferred embodiment thereof.

What I claim is:

1. A device for imparting accurate angular movements to a rotatively mounted member, said device comprising: a fixed element in which said rotatively mounted member is mounted; clamping means for axially clamping said fixed element to said member; a movable arm, said arm being pivotally mounted upon said member; conical tapered means on said fixed member; other conical tapered means complementary to said conical tapered means on said rotatively mounted member adapted to frictionally engage said first means; means for axially moving said rotatively mounted member to produce frictional engagement of said first and second conical means whereby said fixed element and said rotatively mounted member are clamped together without angular movement through clamping; and means for connecting by axial clamping said rotatively mounted member with said movable arm whereby predetermined angular movements of said arm might be given said rotatively mounted member without decreasing accuracy due to angular movements when clamping is effected.

2. In a device for measuring angles comprising a stationary member, a rotatable member mounted in said stationary member and a movable arm pivotally mounted on said rotatable member, first conical tapered means on said stationary member, second complementary conical tapered means on said rotatable member adapted to frictionally engage said first means, means for axially moving said rotatable member to produce frictional engagement of said first and second conical means whereby said stationary member and said rotatable member are clamped together without angular movement through clamping, and means for connecting by axial clamping said rotatable member with said movable arm whereby predetermined angular movements of said arm might be given said rotatable member without decreasing accuracy due to angular movements when clamping is effected.

3. Indexing device comprising a stationary casing having therein a cylindrical bore with a tapered section at one end, a stationary contact on said casing, a similarly shaped rotatable journaled shaft in said casing adapted to frictionally engage said bore, a movable arm pivotally mounted on said shaft, a contact on said arm, said stationary contact and movable contact being so arranged as to selectively engage each other and a gauge put therebetween, a sleeve concentric with and fixedly secured to said shaft, a nut with gear teeth upon its outer periphery, concentric with said shaft and screwed on a threaded portion on said stationary casing, push rods parallel with said shaft and inserted between a side portion of said nut and said sleeve, a worm engaging said teeth on said nut, means for rotating said worm whereby said nut is rotated and said conical tapered portion on said casing and shaft are clamped together by axial movement through the action of said push rods and said sleeve, and means for connecting by axial clamping said sleeve with said movable arm.

4. Indexing device comprising a stationary casing having therein a cylindrical bore with a tapered section at one end, a stationary contact on said casing, a similarly shaped journaled shaft in said casing adapted to frictionally engage said bore, a movable arm pivotally mounted on said shaft, a contact on said arm, said stationary contact and movable contact being so arranged as to selectively engage each other and a gauge put therebetween, a sleeve concentric with and fixedly secured to said shaft, a nut with gear teeth upon its outer periphery, concentric with said shaft and screwed on a threaded portion on said stationary casing, push rods parallel with said shaft and inserted between a side portion of said nut and said sleeve, a worm engaging said teeth on said nut, means for rotating said worm whereby said nut is rotated and said conical tapered portion on said casing and shaft are clamped together by axial movement through the action of said push rods and said sleeve, a sliding member mounted in said movable arm and having therein a notch, said member arranged parallel with said shaft and adapted to slide in said movable arm, a collar portion on said sleeve engaging said notch and a cam-lever pivotally mounted on said sliding member and engaging said movable arm adapted to move longitudinally said sliding member to axially clamp said sleeve and thus to connect said movable arm with said shaft.

5. Indexing device comprising a stationary frame, a stationary arm integral with said frame, a stationary contact on said arm, a rotatably journaled shaft in said frame, a movable arm rotatively mounted on said shaft and adapted to be rigidly connected with said shaft, a contact on said arm, said stationary contact and movable contact being arranged to selectively engage each other at a starting zero position or on a gauge put therebetween the thickness of which corresponds to an angle to be measured, a threaded rod pivotally connected to said stationary arm near its ends, a slider movably mounted on said rod, means for pivotally connecting said slider with said movable arm near its end, means for locking said slider on said rod at a position corresponding to an angle to be repeated between said stationary and movable arms, which position is once determined by engagement of said stationary and movable contacts with a gauge therebetween, and amplifying means for accurately indicating the relative positions of said stationary and movable arms at the zero position and at the position corresponding to the angle to be repeatedly measured.

6. Indexing device comprising a stationary frame having a cylindrical bore with a tapered section at one end, a stationary arm on said frame, a stationary contact on said arm, a complementarily tapered rotatably journaled shaft in said bore adapted to frictionally engage said bore, a movable arm pivotally mounted on said shaft, a contact on said arm, said stationary contact and movable contact being so arranged as to selectively engage each other at a starting zero position or a gauge put therebetween the thickness of which corresponds to an angle to be measured between said movable and stationary arms, a sleeve keyed on said shaft, means for axially moving said shaft and sleeve into frictional engagement of said tapered portions, means for locking said sleeve to said movable arm, a threaded rod pivotally connected to said stationary arm near its end, a slider movably mounted on said rod, means for pivotally connecting said slider with said movable arm near its end, means for locking said slider on said rod at a position corresponding to an angle to be repeated between said stationary and movable arms, which position is once determined by engagement of said stationary and movable contacts with a gauge therebetween, and amplifying means for accurately indicating the relative positions of said stationary and movable arms at the zero position and at the position corresponding to the angle to be repeatedly measured.

7. Indexing device comprising a stationary frame having a cylindrical bore with a tapered section at one end, a stationary arm on said frame having a semi-cylindrical bearing, a first semi-cylindrical contact rotatably mounted in said bearing, a complementarily tapered rotatably journaled shaft in the bore adapted to frictionally engage said bore, a movable arm pivotally mounted on said shaft having a semi-cylindrical bearing, a second semi-cylindrical contact rotatably mounted in said bearing of said movable arm, said semi-cylindrical contacts being arranged to selectively engage each other at a starting zero position or a gauge put therebetween the thickness of which corresponds to an angle to be measured between said movable and stationary arms, means for axially moving said shaft and sleeve into frictional engagement of said tapered portions, a sleeve keyed on said shaft, means for locking said sleeve to said movable arm, a threaded rod pivotally connected to said stationary arm near its end, a slider movably mounted on said rod, means for pivotally connecting said slider with said movable arm near its end, means for locking said slider on said rod at a position corresponding to an angle to be repeated between said stationary and movable arms, which position is once determined by engagement of said stationary and movable contacts with a gauge therebetween, and amplifying means for accurately indicating the relative positions of said stationary and movable arms at zero position and at the position corresponding to the angle to be repeatedly measured.

8. Indexing device comprising a stationary frame, a stationary arm on said frame, a stationary contact on said arm, a rotatably journaled shaft in said frame, a movable arm on said shaft, means for locking said movable arm to said shaft, a movable contact on said arm, said stationary contact and movable contact being so arranged as to selectively engage each other and a gauge put therebetween, a threaded rod pivotally connected to said stationary arm, a slider movably mounted on said rod, means for locking said slider on said rod, locking means for rigidly connecting said slider with said movable arm, a first micrometer mounted on said stationary arm, first lever means controlling said first micrometer on said stationary arm, means on said movable arm for engaging said lever means near the zero position of the device, the adjustment of the micrometer being such that it indicates zero for the zero position of the device, a second micrometer mounted on said slider, second lever means controlling said second micrometer on said slider and means on said movable arm for engaging said last lever means near a predetermined position of the movable arm of the device, the adjustment of the micrometer being such that it indicates zero for the said predetermined position of the movable arm.

9. Indexing device comprising a stationary frame having a cylindrical bore with a tapered section at one end, a stationary arm on said frame, a stationary contact on said arm, a similarly shaped rotatably journaled shaft in said frame adapted to frictionally engage said bore, a movable arm pivotally mounted on said shaft, a movable contact on said arm, said stationary contact and movable contact being arranged to selectively engage each other and a gauge put therebetween, a sleeve concentric with and fixedly secured to said shaft, means for axially moving said shaft and sleeve to frictionally engage the tapered portion on said shaft with the tapered portion on said bore, means for rigidly connecting said sleeve with said movable arm, a threaded rod pivotally connected to said stationary arm, a slider movably mounted on said rod, locking means for rigidly connecting said slider with said movable arm, a first micrometer mounted on said stationary arm, first lever means controlling said first micrometer on stationary arm, means on said movable arm for engaging said lever means near the zero position of the device, the adjustment of said first micrometer being such that it indicates zero for the zero position of the device, a second micrometer mounted on said slider, second lever means controlling said second micrometer on said slider, and means on said movable arm for engaging said last lever means near a predetermined position of the movable arm of the device, the adjustment of said second micrometer being such that it indicates zero for the said predetermined position of the movable arm.

10. Indexing device comprising a stationary frame having a cylindrical bore with a tapered section at one end, a stationary arm on said casing having a semi-cylindrical bearing, a first semi-cylindrical contact rotatably mounted in said bearing, a similarly shaped rotatably journaled shaft in said frame adapted to frictionally engage said bore, a movable arm pivotally mounted on said shaft having a semi-cylindrical bearing, a second semi-cylindrical contact rotatably mounted in said bearing of said movable arm, said semi-cylindrical contacts being so arranged as to selectively engage each other and a gauge but therebetween, a sleeve concentric with and fixedly secured to said shaft, means for axially moving said shaft and sleeve to frictionally engage the tapered portion on said shaft with the tapered portion on said bore, a threaded rod pivotally connected to said fixed arm, a slider movably mounted on said rod, means for locking said slider thereon, locking means for rigidly connecting said slider with said movable arm, a first micrometer mounted on said stationary arm, first lever means controlling said first micrometer on said stationary arm, means on said movable arm for engaging said lever means near the zero position of the device, the adjustment of said first micrometer being such that it indicates zero for the zero position of the device, a second micrometer mounted on said slider, second lever means controlling said second micrometer on said slider, and means on said movable arm for engaging said last lever means near a predetermined position of the movable arm of the device, the adjustment of said second micrometer being such that it indicates zero for said predetermined position of the movable arm.

11. Indexing device comprising a stationary frame having a cylindrical bore with a tapered section at one end, a stationary arm on said casing having a semi-cylindrical bearing, a first semi-cylindrical contact rotatably mounted in said bearing, a similarly shaped rotatably journaled shaft in said frame adapted to frictionally engage said bore, a movable arm pivotally mounted on said shaft having a semi-cylindrical bearing, a second semi-cylindrical contact rotatably mounted in said bearing of said movable arm, said semi-cylindrical contacts being so arranged as to selectively engage each other and a gauge put therebetween, a sleeve concentric with and fixedly secured to said shaft, means for axially moving said shaft and sleeve to frictionally engage said tapered portion with said bore, a threaded rod pivotally connected to said fixed arm, a slider movably mounted on said rod, means for locking said slider thereon, locking means for rigidly connecting said slider with said movable arm, a first micrometer mounted on said stationary arm, first lever means controlling said first micrometer on said stationary arm, means on said movable arm for engaging said lever means near the zero position of the device, the adjustment of said first micrometer being such that it indicates zero for the zero position of the device, a second micrometer mounted on said slider, second lever means controlling said second micrometer on said slider, means on said movable arm for engaging said last lever means near a predetermined position of the movable arm of the device, the adjustment of said second micrometer being such that it indicates zero for the said predetermined position of the movable arm, circumferentially adjustable means including a notch on said rotatable member, index means cooperating with said notch on said stationary member whereby a deviation can be measured at the end of one revolution if the last division does not coincide with the starting position.

12. Indexing device comprising a stationary frame, a stationary arm integral with said frame, a stationary contact on said arm, a rotatably journaled shaft in said frame, a movable arm rotatively mounted on said shaft and adapted to be rigidly connected with said shaft, a contact on said arm, said stationary contact and movable contact being arranged to selectively engage each other at a starting zero position on a guage placed therebetween the thickness of which corresponds to an angle to be measured, a rod pivotally connected to said stationary arm near its end, a slider movable mounted on said rod, means for pivotally connecting said slider with said movable arm near its end, means for fixing the position of said slider on said rod corresponding to an angle to be repeated between said stationary and movable arms with a guage therebetween, and amplifying means for accurately indicating the relative positions of said stationary and movable arms at the zero position and at the position corresponding to the angle to be repeatedly measured.

ARSÈNE PARNET.

References Cited in the file of this patent

UNITED STATES PATENTS

| Number | Name | Date |
|---|---|---|
| 420,278 | Miller | Jan. 28, 1890 |
| 918,065 | Low | Apr. 13, 1909 |
| 1,200,638 | Moor | Oct. 10, 1916 |
| 1,588,963 | Harter | June 15, 1926 |
| 2,173,519 | Jones | Sept. 19, 1939 |
| 2,205,361 | Kearney | June 18, 1940 |
| 2,339,864 | Kruger | Jan. 25, 1944 |
| 2,342,539 | Gorton | Feb. 22, 1944 |
| 2,345,312 | Sorensen | Mar. 28, 1944 |
| 2,406,906 | Saunders | Sept. 3, 1946 |

FOREIGN PATENTS

| Number | Country | Date |
|---|---|---|
| 187,807 | Germany | July 20, 1907 |
| 570,895 | Germany | Feb. 21, 1933 |